(12) United States Patent
Tyrer (10) Patent No.: US 6,773,052 B1
(45) Date of Patent: Aug. 10, 2004

(54) GOLF CART CANOPY COVER

(76) Inventor: Stephen Edward Tyrer, 147 Taft Crescent, Centerport, NY (US) 11721

( * ) Notice: Subject to any disclaimer, the term of this patent is extended or adjusted under 35 U.S.C. 154(b) by 0 days.

(21) Appl. No.: 10/683,795

(22) Filed: Oct. 10, 2003

Related U.S. Application Data (60) Division of application No. 10/190,221, filed on Jul. 5, 2002, now Pat. No. 6,663,161, which is a continuation-in-part of application No. 09/769,858, filed on Jan. 25, 2001, now Pat. No. 6,416,109.

(51) Int. Cl.$^7$ .................................................. B60P 7/02
(52) U.S. Cl. ................................ 296/100.11; 296/77.1; 296/83
(58) Field of Search ......................... 296/100.11, 77.1, 296/100.15, 100.16, 100, 141, 138, 125, 99.1, 102; 135/88, 88.09; 280/DIG. 5

(56) References Cited

U.S. PATENT DOCUMENTS

| | | | | |
|---|---|---|---|---|
| 4,830,037 A | * | 5/1989 | Held | .................... 280/DIG. 5 |
| 5,069,481 A | * | 12/1991 | Strange | .................. 280/DIG. 5 |
| 5,190,340 A | | 3/1993 | Nuscher | |
| 5,388,881 A | * | 2/1995 | Spencer et al. | ............. 296/77.1 |
| 5,393,118 A | | 2/1995 | Welborn | |
| 5,429,290 A | * | 7/1995 | Greene, Jr. | ............ 280/DIG. 5 |
| 5,531,478 A | | 7/1996 | Houston et al. | |
| 5,588,690 A | * | 12/1996 | Showalter | .............. 296/100.11 |
| 5,688,018 A | * | 11/1997 | Simpson | .................... 296/77.1 |
| 5,741,041 A | | 4/1998 | Sullivan | |
| 6,068,325 A | | 5/2000 | Hughes | |
| 6,216,714 B1 | * | 4/2001 | Tucker | .................. 280/DIG. 5 |
| 6,220,647 B1 | | 4/2001 | Winkler | |
| 6,227,603 B1 | * | 5/2001 | Brock | .................... 296/100.01 |
| 6,416,109 B1 | * | 7/2002 | Tyrer et al. | ............ 296/100.11 |
| 6,471,281 B1 | * | 10/2002 | Tyrer et al. | ............ 296/100.11 |
| 6,547,312 B2 | * | 4/2003 | Winkler | .................. 296/100.14 |
| 6,601,904 B2 | * | 8/2003 | Winkler | .................. 296/100.14 |
| 6,692,058 B1 | * | 2/2004 | Micco | .................... 296/100.03 |

OTHER PUBLICATIONS

U.S. patent application Ser. No. 10/176,945, Tyrer.

* cited by examiner

*Primary Examiner*—Kiran Patel
(74) *Attorney, Agent, or Firm*—Michael T. York (57) ABSTRACT

An improved canopy assembly for attaching a rearwardly extending protective canopy to a motorized golf cart of the type having a top covering the passager seating area and an uncovered bag storage area reward of the seating area that includes a golf bag support bracket that prevents the golf bags from tipping over. The canopy assembly includes a base member that attaches directly to the golf bag support bracket, a frame that pivotally attaches to the base member and a sheet of flexible water-resistant material suspended over the frame. The canopy assembly may be extended where in the protective canopy substantially covers the cart's golf bag storage area protecting the bags from rainfall. The canopy assembly may be folded wherein the protective canopy is moved out of the way allowing golf clubs to be removed from the golf bags without hitting the canopy assembly.

8 Claims, 10 Drawing Sheets

GOLF CART CANOPY COVER

RELATED APPLICATIONS

This application is a division of application Ser. No. 10/190,221, filed Jul. 5, 2002, now U.S. Pat. No. 6,663,161 which is a continuation part application of application Ser. No. 09/769,858, filed Jan. 25, 2001, now U.S. Pat. No. 6,416,109 granted Jul. 9, 2002. U.S. Pat. No. 6,663,161 is hereby incorporated herein by reference.

FIELD OF THE INVENTION

This invention relates generally to the field of golf cart canopy covers, specifically to an improved canopy cover that protects golf bags and clubs from rain.

DESCRIPTION OF THE RELATED ART

Canopy covers in the past have been utilized to protect golf bags and clubs located in the rear bag storage compartment of golf carts from rain and damp weather conditions. It is well known in the sport that wet golf club grips can hinder the performance of the player and is undesirable.

Generally, canopy covers attach to the back of the cart's top and to the cart's frame section that supports the top. The connection to the top is typically made with an extruded channel member that accepts the top edge of the canopy. The connection to the cart's frame is made using a structural base member that serves as a mounting base for a frame supporting the canopy. The base member generally attaches directly to the frame of the cart. However, different cart makes and models have different frame structures making it necessary to change the canopy's base member's geometry to properly mate with the cart's structural frame. Likewise, different top sections make it difficult to find one extruded channel member that fits all golf cart tops.

An example of a canopy cover to protect golf bags and clubs is U.S. Pat. No. 4,830,037 to William T. Held. This canopy cover discloses a cover that includes a channel that attaches to the back of the cart's top, base members that attach to the frame of the cart supporting the top of the cart and a canopy structure that supports the flexible canopy and is pivotally attached to the base member. As can be seen in the drawings and description of this patent, the base members attached to the cart frame are specifically designed for a particular style cart with a specific frame. It can be easily understood that if the frame design was substantially different as with another cart make or model, the base members of the canopy would likely need to be changed to enable them to still attach to the frame. In fact, as detailed in the description section in this patent, the base members utilize two specific preexisting holes in the cart's frame that must be located in a specific area in order for the canopy's base members to attach. Additionally, it can be seen that the canopy assembly of this device is complicated, requiring a number of different processes to produce a relatively large number of parts and a significant amount of assembly. This results in a relatively expensive product making it burdensome for a perspective user to purchase. The canopy assembly described in this patent cannot take advantage of the ability to produce one canopy assembly for many different types of golf carts since different canopy base members would need to be designed in order to attach to a variety of frames. In addition, the relatively large number of fasteners and other components reduces the robustness and reliability of the invention described in this patent, increasing the likelihood of a loose fastener caused by normal cart usage.

Another example of a cover to protect golf bags and clubs is U.S. Pat. No. 5,190,340 to Edwin H. Nuscher. This patent discloses a cover that includes a L-shaped top extending rearwardly from the top of the golf cart. In this patent the cover is supported by L-shaped support bars that attach to the top assembly of the cart. The cover is substantially elevated above the top of the cart to allow access to the golf clubs in the golf bags. However, one can easily see that this type of cover has several key disadvantages. The substantial elevation of the cover above the cart's top would severely limit the cart's usage in heavily wooded areas where it is desirable for the cart to travel under low tree branches. The branches could collide into the described cover causing damage to both the cover and the tree. Additionally, wind could easily carry rain on an angle from the sides of the cover into the bag storage area getting the golf bags and clubs wet. The L-shaped cover would also slow the cart's mobility when traveling against the wind since the cover has a large face that is not aerodynamic allowing the wind to hinder to cart's performance. The L-shaped roof is also not aesthetically pleasing to the eye making its marketability questionable.

Another example of an enclosure to protect golf bags and clubs is U.S. Pat. No. 5,588,690 to Jerry M. Showalter. This patent discloses an enclosure that includes a roof panel, a hem portion coupled to the roof panel, a back cover coupled to the roof panel and a second back cover coupled to the roof panel. The invention described in this patent has several key disadvantages. The enclosure includes a roof panel that overlays the existing roof on the golf cart. This requires a lot of material that is relatively expensive leading to a more expensive product. The enclosure lacks a frame structure to suspend it substantially over the clubs resulting in a cover that drapes over the clubs and bag. When the cover is wet, the player must roll or fold it up to expose the golf bags underneath. This action would likely result in the user getting his or her hands wet. Additionally, the enclosure is not aesthetically pleasing since it looks sloppy.

Another example of a cover to protect golf bags and clubs is U.S. Pat. No. 6,068,325 to Charles A Hughes. This patent discloses a cover that includes four panels that are sewn together along their edges to form a large, rectangularly-shaped box that is secured to the frame of the cart that supports the roof and to the back of the roof covering the seating compartment The back panel of this cover contains a bag for storing the back panel after it has been folded up. However, this type of cover has a number of disadvantages. To access the covered clubs the player is forced to unhook two hook and loop straps and roll the wet cover up. This is far from convenient and would likely result in the player and possibly the clubs getting wet from the wet cover. The procedure is also slow requiring a significant amount of time. The player must unhook the cover, roll it up and let the cover back down while the player hits the ball. The procedure has to be repeated to return the club back into the golf bag.

Another example of a roll-up type cover to protect golf bags and dubs is U.S. Pat. No. 5,741,041 to Diane Sullivan. This patent discloses a roll-up type cover that utilizes a shock cord to attach the bottom of the cover to the cart and hooks to attach the top of the cover to the back edge of the carts top. This cover has similar disadvantages as U.S. Pat. No. 6,068,325 in that the player must bend over and unhook two shock cord hooks that extend from the bottom edge of the cover to allow the player to roll the cover up. Again, it is likely that the player will get wet during this procedure and it is time consuming. Additionally, the cover lacks a structural frame making it sloppy looking and not aesthetically pleasing.

Another example of a roll-up cover to protect golf bags and clubs is U.S. Pat. No. 5,688,018 to John Albert Simpson. This patent discloses another roll-up type cover similar to U.S. Pat. No. 5,741,041 and shares the same disadvantages.

BRIEF SUMMARY OF THE INVENTION

The present invention provides an improved canopy assembly for attachment onto a golf cart to protect golf bags and clubs located in the back of the cart from rain. The invention allows the user to quickly extend the canopy to protect clubs and bags from rainfall and just as quickly fold up the cover to allow access to the clubs. Additionally, the invention enables the user to quickly attach and detach the canopy onto the cart's golf bag support bracket on a variety of different golf cart makes and models since the invention utilizes a versatile attachment method that does not require attachment to the cart top.

Other advantages and features of the present invention will become apparent when viewed in light of the subsequent description of the preferred embodiment and the appended claims, taken in conjunction with the accompanying drawings.

DETAILED DESCRIPTION OF THE PREFERRED EMBODIMENT(S)

Figure 1:
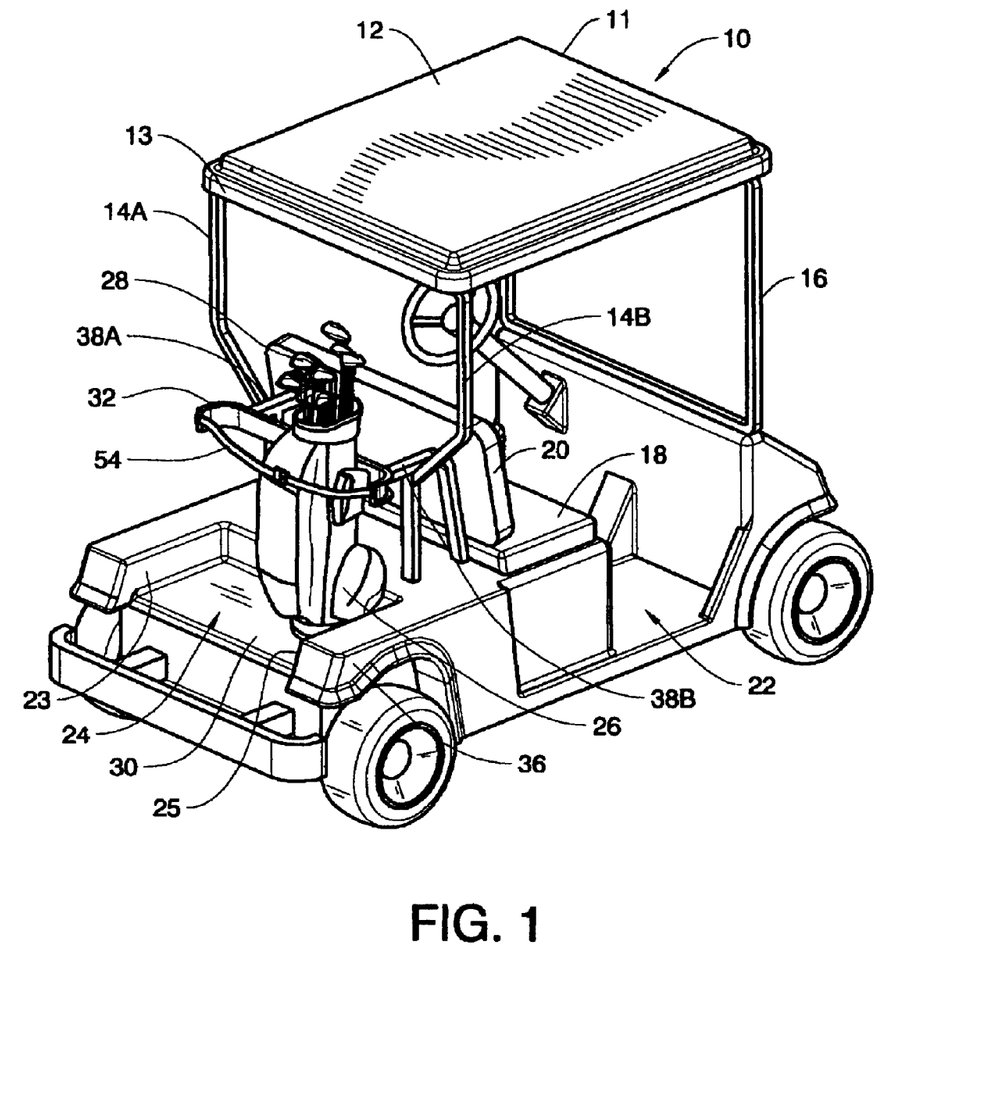
FIG. 1 is a rear perspective view of a golf cart in which an embodiment of the present invention may be used.
Figure 3:
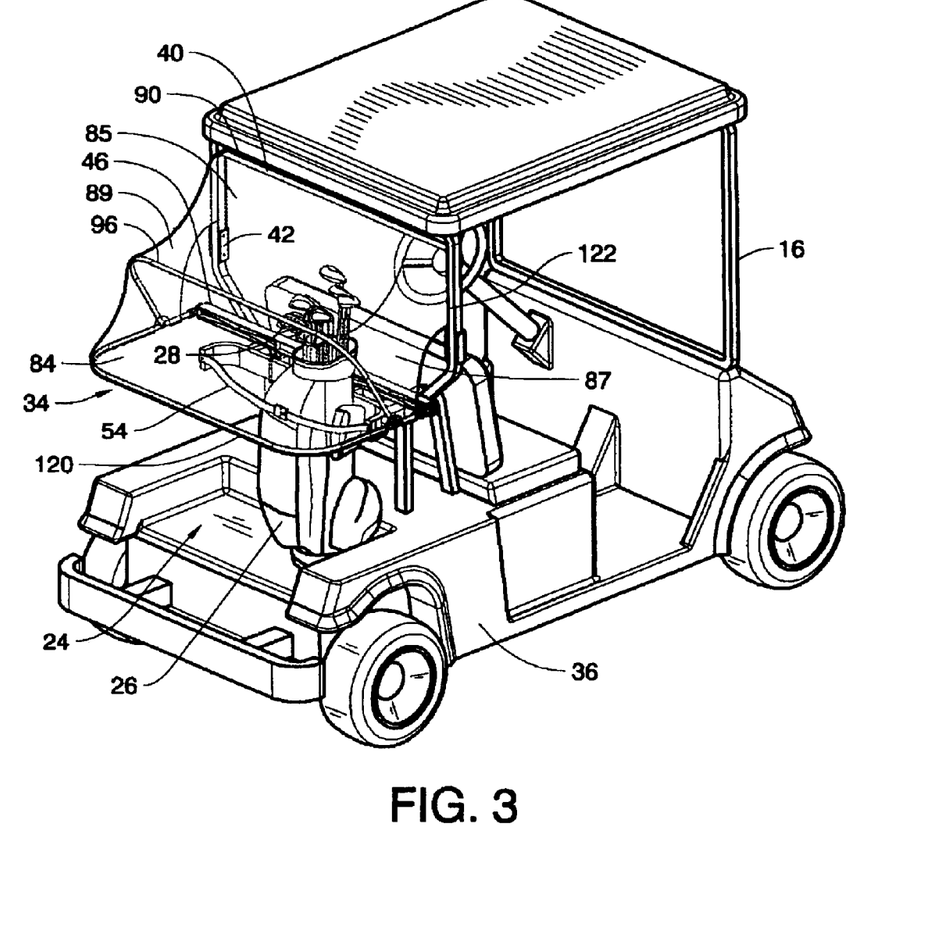
FIG. 3 is a rear perspective view of the golf cart with the embodiment of the present invention attached with the cover extended to protect the golf bag and clubs from rain.

FIG. 1 shows a perspective view of a motorized golf cart 10 to which an embodiment of a canopy attachment in accordance with the present invention, generally indicated as a canopy assembly 34 in FIG. 3, can be attached. Cart 10 has a top 12 that is attached the upper ends of laterally spaced apart vertically extending frame members consisting of rear frame members 14A and 14B and the upper portion of a front frame member 16 using fasteners. Top 12 can be made of a molded plastic part and is used to protect passengers sitting in a passenger compartment 22 from rain. The passengers sit on a seat 18 with their back resting on a seat back 20. Behind seat back 20 is a bag storage area 24.

With reference again to FIG. 1, bag storage area 24 is used to store one or more golf bags 26 containing golf clubs 28. The bottom of golf bag 26 rests on a bottom 30 of a cart body 36. The upper portion of the golf bag is supported by a U-shaped bag support 32 that prevents golf bag 26 from tipping over. Bag support 32 can be made of a molded plastic part with straps 54 attached to it to secure the golf bag to the bag support. Bag support 32 is mounted onto frame extensions 38A and 38B of cart 10 using fastening means (not shown), as for example threaded bolts and nuts. Frame extensions 38A and 38B are made of metal and attached to rear frames 14A and 14B by fastening means, welding or are a continuous extension of the rear frames. Frame extensions 38A and 38B may also continue past rear frames 14A and 14B and support seat back 20. The frame extensions and rear frames together makeup a frame assembly 21.

Referring again to FIG. 1, bag storage area 24 is generally formed as part of cart body 36 that opens toward the rear of the cart. The bag storage area is defined by bottom 30, two opposite sides 23, 25 and seat back 20. Top 12 has a front edge 11 and a rear edge 13 and is located above passenger compartment 22. The top does not cover the bag storage area to allow the player to remove golf clubs 28 from golf bag 26 without hitting the golf dub on the underside of top 12 while trying to lift the golf dub out of the golf bag. Therefore, the bag storage area and the golf bag are exposed to rainfall. In order to protect bag storage area 24 it is necessary to have a cover that can be folded out of the way so that the player may remove the golf clubs without being hindered by a covering directly above golf bag 26.

Figures 2, 2A:
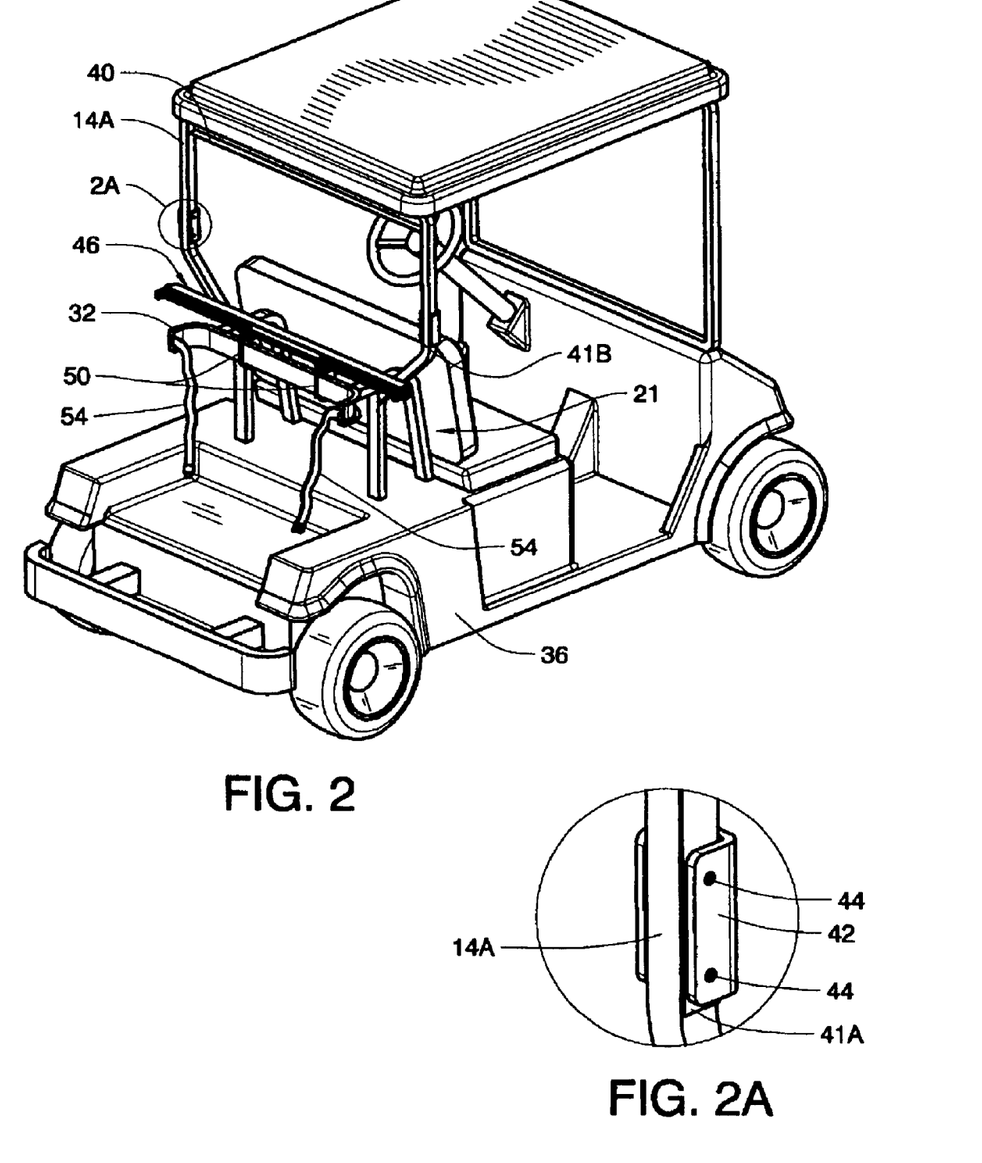
FIG. 2 is a rear perspective view of the golf cart with canopy attachment members mounted to the cart.
FIG. 2A is an enlarged partial view of the front strut attachment to the golf cart.

FIGS. 2 and 2A show the components necessary to mount an embodiment of this invention referred to as canopy assembly 34, shown in FIG. 3, to cart 10. A front strut 40 is secured to rear frame members 14A and 14B using U-channels 42 that contain setscrews 44. Setscrews 44 thread through threaded bores in U-channels 42 bottom against front strut 40, pinching front strut 40 against rear frame members 14A and 14B . In this way, the front strut is secured to an intermediate portion of the rear frame members supporting the top of the cart. The front strut provides structural support for a top edge 90 of a canopy 84, shown in FIG. 3. Top edge 90 of canopy 84 is rolled and sewn, forming a sleeve 92. Front strut 40 slides through sleeve 92 before the front strut is attached to rear frame members 14A and 14B. Alternatively, top edge 90 can be wrapped around the front strut. Front edges 122 can also be attached to front strut 40 using similar methods. The front strut can be made from metal, such as tubing or flat metal stock, however, strong plastic would also work. U-channel 42 can be made from stamped or formed metal channels or may be molded from high strength plastic. Setscrews 44 can be made from metal or other high strength materials. The setscrews are tightened by the installer when front strut 40 is in the desired location. When the bottom of the setscrew contacts the surface of front strut 40, U-channel 42 tightens against frame members 14A and 14B, holding the front strut in position.

There are numerous variations that could be made to front strut 40 and U-channel 42 without departing from the scope of the present invention. For example, the front strut could be made into a rectangular member having four sides. This member could be connected together to form a nearly continuous or entirely continuous rectangular loop. Front strut 40 could also be made from a number of sections secured together. Therefore, the illustrated and described front strut 40 could be replaced by another type of front strut that also provided structural support for at least top edge 90 of canopy 84, shown in FIG. 3. U-channel 142 and setscrews 44 could be replaced by U-bolt assemblies or other types of clamping mechanisms. Also the clearance holes in the front strut to allow the passage of the setscrews could be eliminated. In addition, the U-channel and the setscrew could be eliminated by directly mounting front strut 40 to rear frame members 14A and 14B supporting the top. This could be accomplished by using fasteners such as rivets, bolts, self-tapping screws, magnets, clamps or other types of fasteners to secure end portions 41A and 41B to rear frame members 14A and 14B. The front strut could also be mounted to other portions of frame assembly 21 that supports top. 12, seat back 20 and golf bag support 32 of the golf cart.

There are numerous variations that could be made to the described method of attaching front strut 40 to top edge 90 and front canopy edge 122 without departing from the scope of the present invention. Both edges could wrap around the strut using either hook and loop fastening strips, snaps, buttons or other fastening means. In addition, the top edge and the front canopy edge could be directly attached to the front strut using rivets, snaps, hook and loop fastening strips or other fastening means that would eliminate the need to wrap theses edges around the front strut. Also, one may choose to only support top edge 90 and not support canopy front edges 122 with the front strut.

Figure 4:
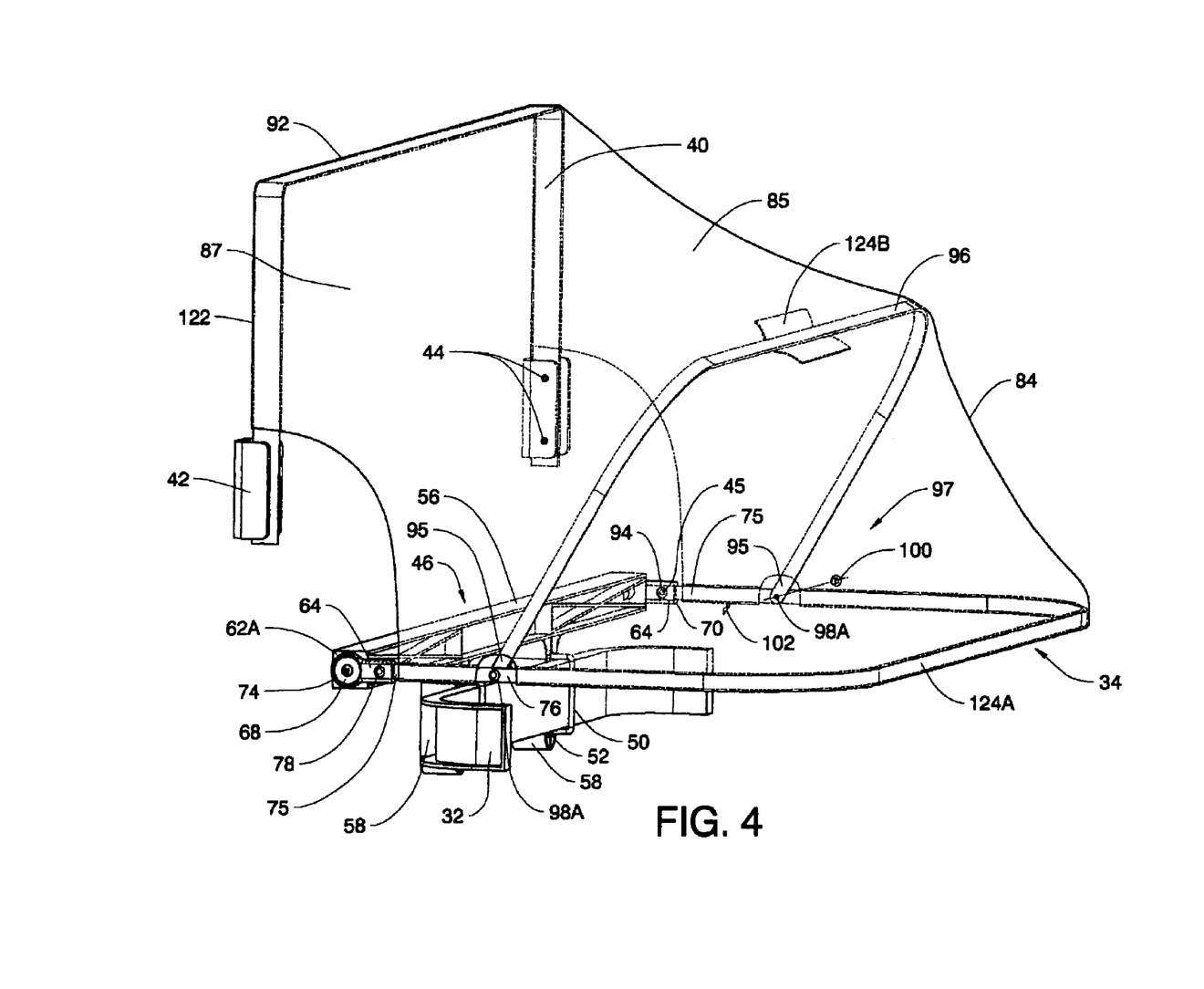
FIG. 4 is a side perspective view of the embodiment of the present invention attached to the cart's bag support bracket without the cart present and with the cover extended.

A base member 46 is a structural bracket that is attached to bag support 32 by U-bolts 50, as shown in FIGS. 2 and 4. The U-bolts surround the bag support and pass through holes 52 in flanges 58. Base member 46 serves as a structural member for mounting a pivotal frame structure 97 of canopy assembly 34, shown in FIG. 4. The base member may be made from molded plastic, steel or other structurally strong materials.

Figure 5:
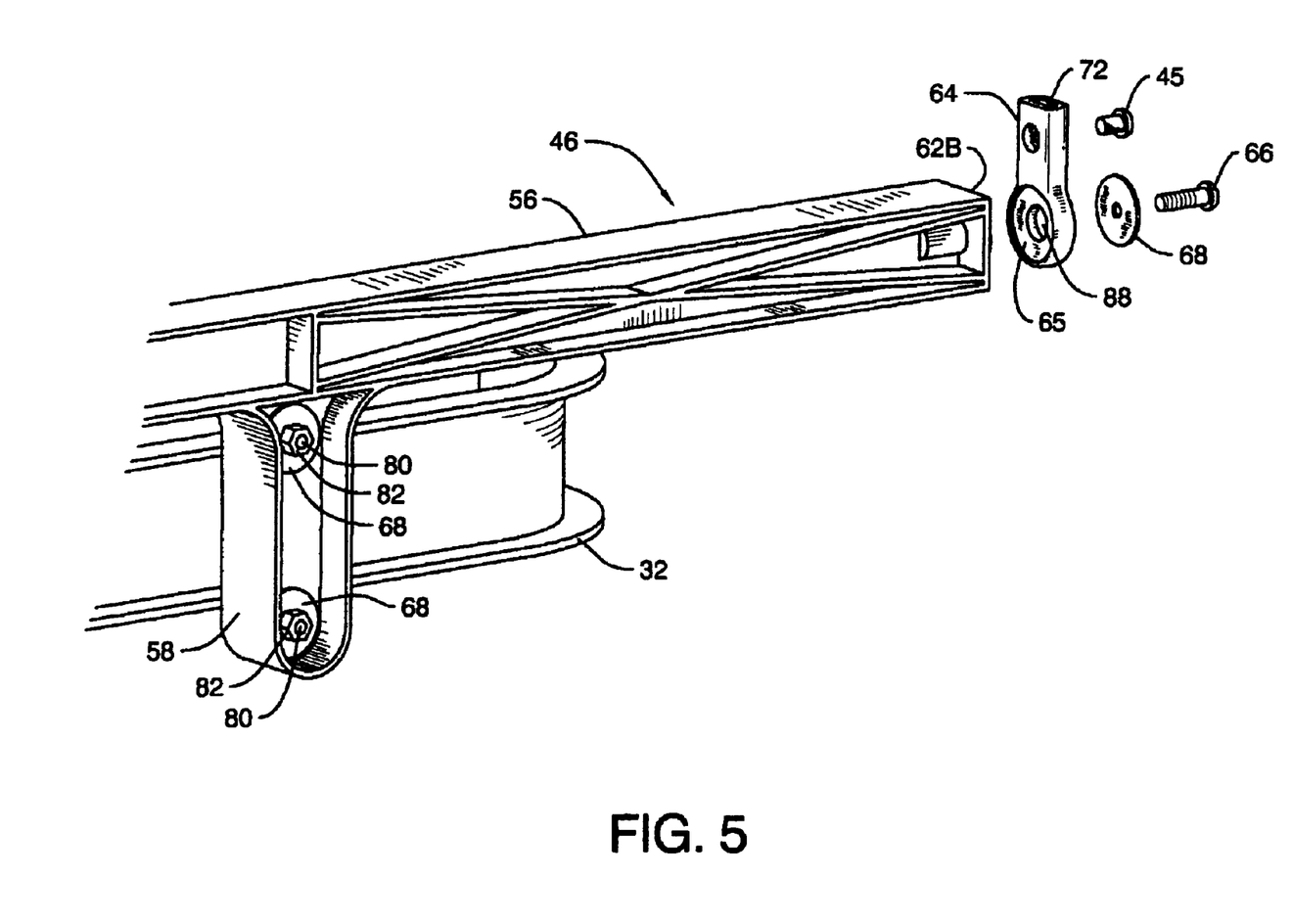
FIG. 5 is a partial rear perspective view of the base member secured to the bag support with the pivot arm and associated hardware exploded, the canopy and cart are eliminated from clarity.

As shown in FIGS. 4 and 5, U-bolts 50 are used to secure base member 46 to bag support 32 and are secured using washers 68 and nuts 82 that are mounted onto U-bolt ends 80. When the nuts are tightened, flanges 58 contact the outer surface of bag support 32 clamping them together. U-bolts 50 can be made from metal as for example steel, however, molded plastic would also work.

Figure 6A:
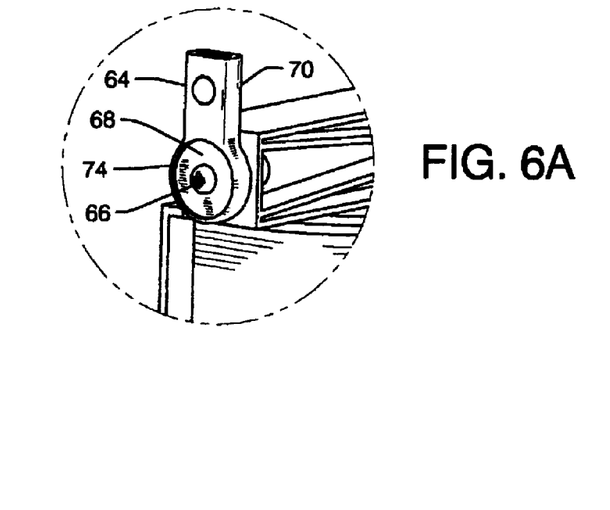
FIG. 6A is an enlarged partial view of the pivot arm mounted on the base member.
Figure 7:
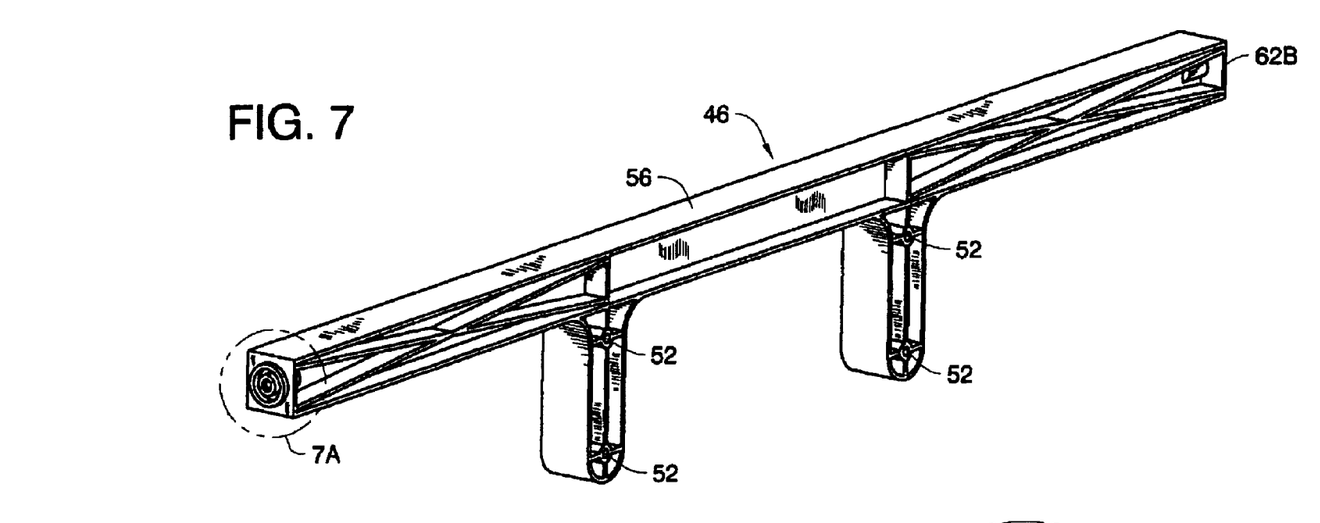
FIG. 7 is a rear perspective view of the base member only.
Figure 7A:
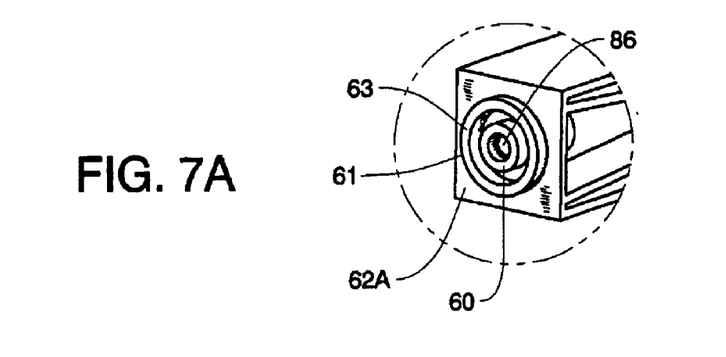
FIG. 7A is an enlarge partial view of the end of the base member.

With reference to FIGS. 5, 7 and 7A, base member 46 can be made of one continuous piece of high strength molded plastic, as for example nylon, with a beam 56 spanning the upper portion and two mounting flanges 58 extending from the bottom of the beam. The width of the beam corresponds to the width of the bag storage area. End faces 62A and 62B are located on opposite ends of beam 56. A cylindrical inner boss 60 extends from each end face 62A and 62B to form a mounting cylinder for a pivot arm 64, shown in FIG. 6A, to mount onto. A cylindrical outer ring 61 also extends off of end faces 62A and 62B surrounding inner boss 60. Both the inner boss and the outer ring are formed as part of base member 46. The outer ring provides a mating surface 63 that contacts a pivot face 65 on pivot arm 64 when the pivot arm is assembled onto inner boss 60 using a screw 66. The surface to surface contact between surface 63 and pivot face 65 creates constant resistance to rotation of the pivot arm 64 due to friction between them. This resistance holds canopy 84, shown in FIG. 8, in a folded position when the user forces the canopy upward to allow access to golf clubs 28 and prevents the weight of canopy 84 from rotating pivot arms 64 downward which would result in extending the canopy. Beam 56 has a generally I-beam shaped cross section that provides structural rigidity for the base member 46. Flanges 58 provide mounting extensions of the beam that contact the outer surface of bag support 32, as previously described. The flanges contain holes 52 that the ends of the U-bolts pass through. The flanges are formed as a continuous part of beam 56.

There are numerous modifications and variations that could be made to the described method of attaching pivot arms 64 to end faces 62A and 62B and attaching the base member to the bag support without departing from the scope of the present invention. For example, inner boss 60, outer ring 61 and mating surface 63 could be eliminated with the pivot arm directly mounting to the end faces using a type of fastener. In this way, the pivot arm would rotate freely without resistance due to friction. In addition, base member 46 secured to the bag support using threaded fasteners, rivets, clamping devices or other fasteners.

Figure 6:
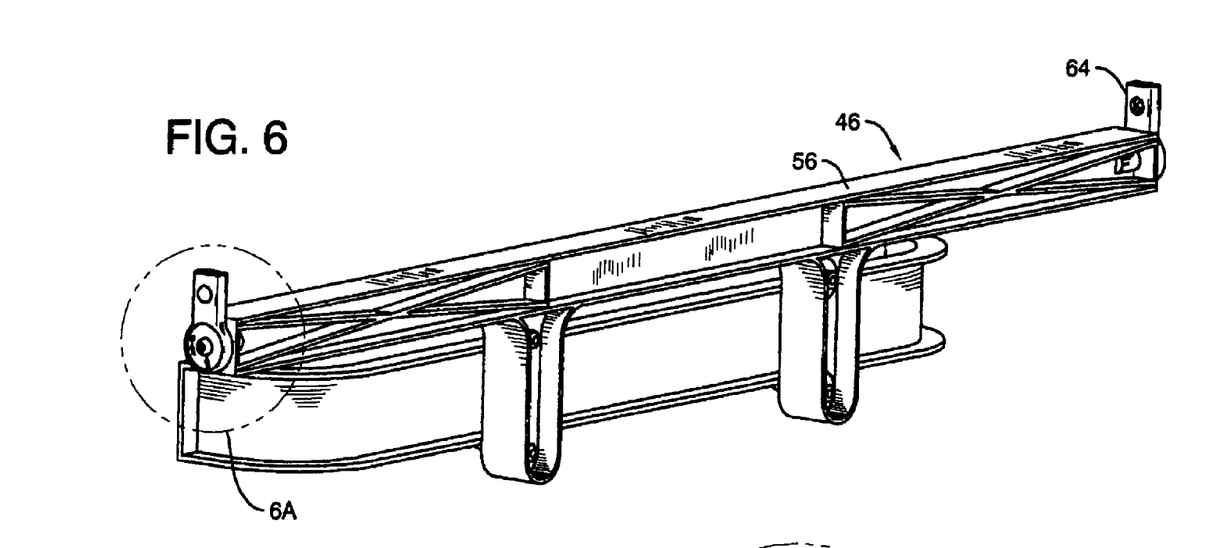
FIG. 6 is a rear perspective view of the base member including the pivot arms secured to the bag support without the cart or the canopy present.

With reference to FIGS. 6A, 7 and 7A, on each end of beam 56 are end faces 62A and 62B. Inner boss 60, formed as part of the base member, contains a small diameter screw bore 86 in the center of the boss. The bore has a diameter slightly smaller than the outside diameter of the threads on screw 66 and is sized to allow screw 66 to self-tap into the screw bore to secure pivot arm 64 onto inner boss 60 on each end of beam 56, as shown in FIG. 6. Washer 68 is used to distribute the clamp force of screw 66 on pivot arm 64 holding the pivot arm on the inner boss and keeping mating surface 63 in contact with the pivot face 65, shown in FIG. 5, on pivot arm 64.

With reference to FIGS. 5, 6A and 7A, pivot arm 64 is a separately molded plastic part made from a high strength, molded plastic, as for example nylon . The pivot arm contains a pivot hole 88 that has a diameter that is slightly larger than the outside diameter of inner boss 60 allowing the pivot arm to rotate around the inner boss when the pivot arm is slid over the boss and secured in place by washer 68 and screw 66, as shown in FIG. 6A. Both the screw and the washer can be made of steel. Pivot arm 64 extends outward from a cylindrical mounting end 74 and transitions to a rectangular cross section receiving a end 70, shown in FIG. 6A, that has a hollowed rectangular socket 72, shown in FIG. 5, that is sized to receive bracket ends 75 of a support bracket 76 as shown in FIG. 4. In this way, the pivot arms become a form of a pivotal attachment mechanism by pivotally connecting support bracket ends 75 to base member 46.

There are numerous modifications and variations that could be made to the described base member 46 and pivotal arms 64 without departing from the scope of the present invention. For example, pivot arms 64 could be made from a number or different geometries that would still attach to the ends of support bracket 76 onto base member 46. In addition, pivot arms 64 could be eliminated with support bracket ends 75 being directly attached to base member 46 using a bolt, screw or other fastening means that would still allow the support bracket to rotate.

With reference again to FIGS. 4 and 5, support bracket 76 is used to structurally support canopy 84 and is generally a U-shaped continuous rigid support with opposite bracket ends 75 that have a rectangular cross section to facilitate insertion into socket 72. In this way, the support bracket is pivotally connected to base member 46. The length of support bracket 76 corresponds to the size of bag storage area 24 to ensure that when the support bracket is extended it covers the majority of the bag storage area. Near the ends of the support bracket 76 are rivet holes 94 that align with clearance holes 78 in the pivot arms to allow the insertion of rivets 45. Rivets 45 secure bracket ends 75 of support bracket 76 into sockets 72 and prevent the ends of the support bracket from coming out of sockets 72 because the rivets cannot slide through sockets 72.

There are numerous variations that could be made to the described support bracket 76 without departing from the scope of the present invention. For example, other types of fastening means could be used to secure the bracket ends 75 to pivot arms 64, as for example screws, bolts, or pins.

With reference again to FIG. 3, canopy 84 is made from a thin sheet of flexible water-resistant material like vinyl that is sewn together. Canopy 84 is defined by a canopy top 85 and two generally opposing canopy sides 87 and 89. The canopy has a bottom edge 120, top edge 90 and front canopy edges 122 that define the limits of the canopy.

With reference again to FIG. 4, support bracket 76 and a mid-support bracket 96 together form pivotal frame structure 97 that supports the canopy. The mid-support bracket is generally a U-shaped continuous support with opposite support ends 95 that have rectangular cross sections. The length of the mid-support bracket corresponds to the desired shape of the canopy that it supports. Both the support bracket and the mid-support bracket are made of a semi-rigid material like spring steel or a high strength plastic, as for example nylon. Both the support bracket and mid-support bracket pass through sewn channels 124A and 124B, respectively, in the canopy to locate them in the desired position within canopy 84. In this way, the canopy is attached to support bracket 76 and mid-support bracket 96. Support bracket 76 has pin holes 98A that align with pin holes 98B in mid-support bracket 96 to allow pins 100 to pass through, pivotally connecting the support bracket and mid-support bracket together. Lock pins 102 are assembled onto the ends of pins 100 to secure the pins in position. In this way, the mid-support bracket is free to pivot about pins 100 relative to support bracket 76. Support bracket 76 and mid-support bracket 96 together makeup the pivotal frame structure for supporting the canopy.

There are numerous modifications and variations that could be made to the described pivotal frame structure without departing from the scope of the present invention. For example, the support bracket and mid-support bracket could both be connected to the base member, without connecting to each other, eliminating the need for pins 100. Both support bracket 76 and mid-support bracket 96 could be attached to the canopy using either hook and loop fastening strips, snaps, buttons or other fastening means. In addition, the mid-support bracket could be eliminated, leaving only the front strut and the support bracket to cooperate to structurally support the canopy.

With reference again to FIGS. 3 and 4, canopy assembly 34 is attached to cart 10 and is extended to protect golf bag 26 and golf clubs 28 from adverse weather conditions like rainfall. In the extended position shown, canopy 84 is pulled taunt from front strut 40 and stretches over mid-support bracket 96 and down over support bracket 76. Therefore, front strut 40, mid-support bracket 96 and support bracket 76 cooperate to support canopy 84. In this way, canopy 84 covers bag storage area 24 and remains in this position due to the weight of the canopy, support bracket 76 and mid-support bracket 96.

Figure 8:
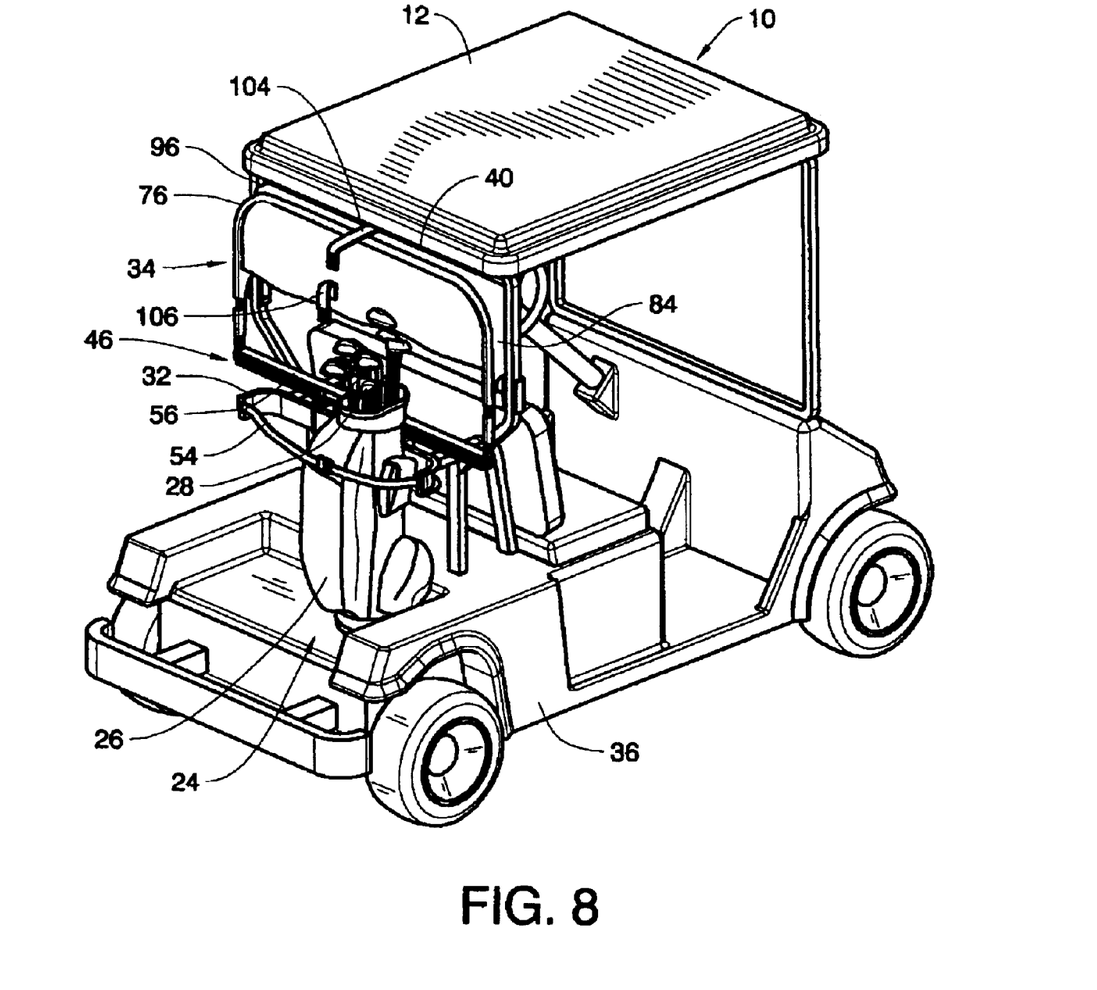
FIG. 8 is a perspective view of the cart with the embodiment of the present invention attached and the canopy folded up to allow access to the golf clubs.

With reference to FIG. 8, canopy assembly 34 is attached to cart 10 and is shown in a fold d up position to allow access to golf bag 26 and golf clubs 28. Canopy 84 is folded up from the extended position, as shown in FIG. 4, by gripping the bottom of canopy 84 near support bracket 76 and lifting the support bracket upwardly, toward the back of top 12. The moment force created from this lifting action causes pivot arms 64 to rotate around inner bosses 60. The mid-support bracket pivots relative to support bracket 76 around pins 100. At approximately the halfway point of folding up the canopy, support bracket 76 contacts mid-support bracket 96 with the cover material folded in-between them and begins to rotate upwardly toward the back of top 12. When the lifting action is completed, as shown in FIG. 8, both support bracket 76 and mid-support bracket 96 are substantially vertical and the user may release the canopy. The friction between mating surfaces 63 on beam 56 and pivot face 65 on each pivot arm 64 prevents the canopy from falling back into the extended position. Therefore, the canopy is held in the folded position, as shown in FIG. 8, by the friction between mating surface 63 and pivot face 65. If the weather conditions improve and the player wishes to have the cover retained in the folded position while driving the cart, he or she may choose to fasten the cover in this position using the hook and loop fastening method, shown in FIG. 8. A hook strap 104 is sewn to the canopy on the outer face near top edge 90 and is wrapped around the folded canopy and attached to a loop strap 106 that is sewn to the inner face of the canopy near the top edge. The player may extend the canopy by separating the hook strap from the loop strap and pulling the bottom of canopy 84 near support bracket 76 downwardly and toward the back of the cart. This will extend the cover over bag storage area 24, as shown in FIG. 3.

There are numerous variations that could be made to the described retention method without departing from the scope of the present invention. For example, the friction between mating surface 63 and pivot face 65 could be eliminated and the canopy retained in the folded position using hook and loop fasteners as described or snaps, buttons, magnetic strips, ties or other securing means.

Figure 9:
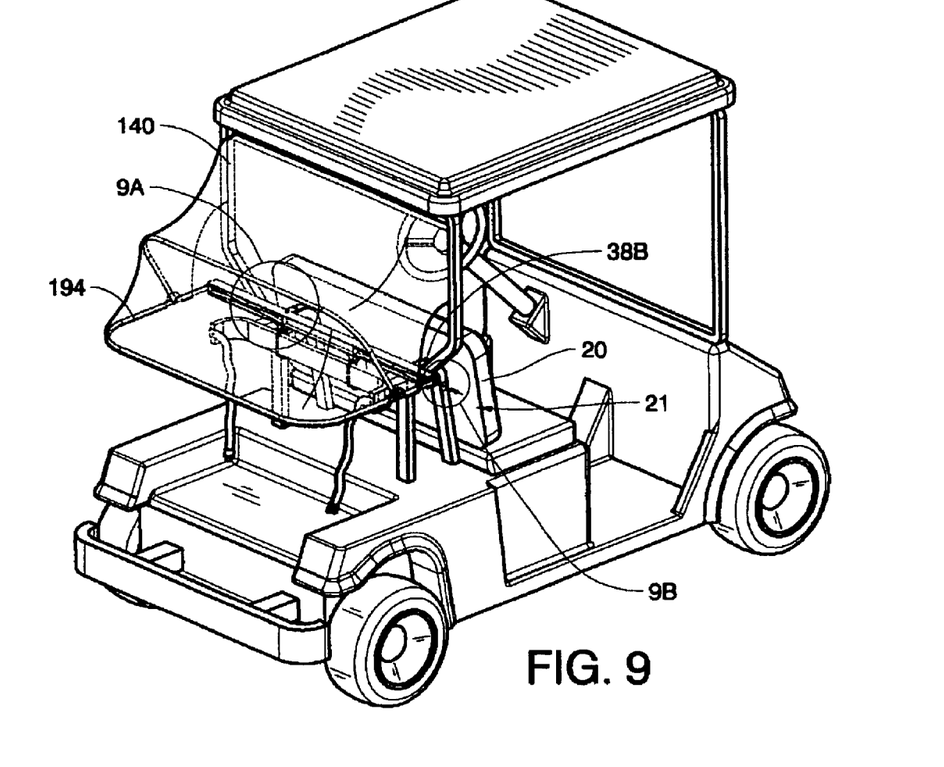
FIG. 9 is a side perspective view of a first alternative embodiment of the present invention attached to the cart's bag support bracket.
Figure 9A:
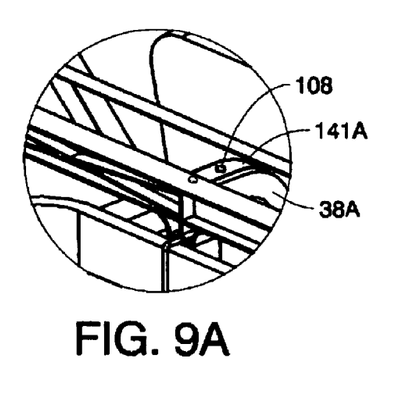
Figure 9B:
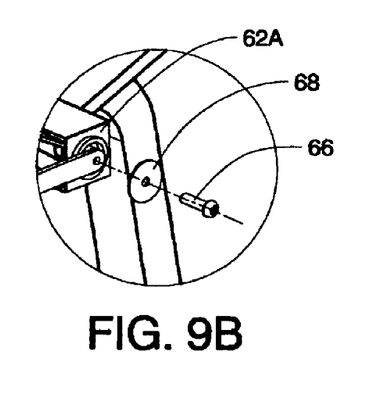

In a first alternative embodiment of this invention, shown in FIG. 9, pivot arms 64 and rivet holes 94 are eliminated. Pivot holes 194 are assembled directly onto end faces 62A and 628. In the first alternative embodiment, a first modified support bracket 176 is pivotally attached directly to base member 46 using screws 66. In addition, front strut 40 has been replaced by a first modified front strut 140 that is attached directly to frame extensions 38A and 38B that support seat back 20. The attachment is made using rivets 108 that pass though first modified end portions 141A and 141B and secure in the frame extensions. It should be understood that the rivets could be replaced by screws, bolts, clamps or other fasteners. First modified front strut 140 could also attach to other portions of frame assembly 21.

Figures 10, 10A:
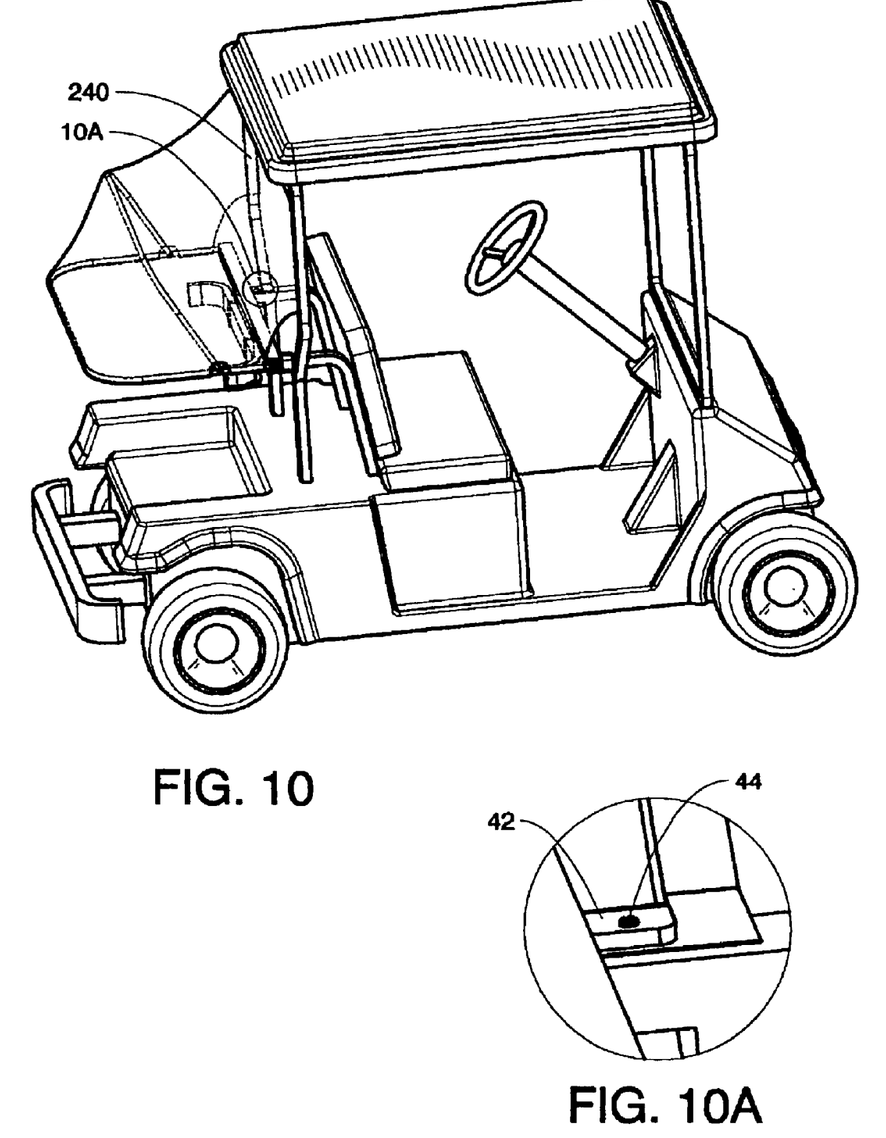
FIG. 10 is a side perspective view of a second alternative embodiment of the present invention attached to the cart's bag support bracket.

In a second alternative embodiment of this invention, shown in FIG. 10, a second modified front strut 240 is attached to frame extensions 38A and 38B that support bag support 32. The second modified front strut is attached to the frame extensions using U-channel 42 and setscrews 44 as previously described. However, the second modified strut could also be directly attached to the frame extensions using screws, bolts, clamps or other fasteners.

CONCLUSION, RAMIFICATIONS, AND SCOPE OF INVENTION

Although the description above contains many specificities, these should not be construed as limiting the scope of the invention but as merely providing illustrations of some of the presently preferred embodiments of this invention. For example, the plastic molded base member 46 could be replaced with a steel or wood base member; the base member could have a different shape or be made of an assembly of different parts; the U-bolts used to mount the base member to the bag support could be replaced with another fastening means like a threaded nut and bolt passing through the bag support, rivets, screws or clamps; screw 66 fastening pivot arms 64 onto inner boss 60 could be replaced by snap fitting pivot hole 88 over a corresponding inner boss; one pivot arm 64 could be removed by only attaching one end of support bracket 76 to base member 46; pivot arm socket 72 could be eliminated with support bracket 76 attaching another way to the pivot arm; mid-support bracket 96 could also be directly attached to base member 46 or additional pivot arms 64 instead of attaching to the midsection of support bracket 76, etc.

Thus the scope of the invention should be determined by the appended claims and their legal equivalents, rather than by the examples given.

What is claimed is:

1. A canopy assembly for attaching a rearwardly extending canopy to a golf cart having a seating compartment, a golf bag compartment located rearwardly of said seating compartment, a top assembly including a top positioned over said seating compartment, a frame assembly including front and rear laterally spaced apart and vertically extending frame members supporting said top and frame extensions supporting a golf bag support bracket located rearwardly of said seating compartment and a seat back, said canopy assembly being moveable between an extended first position where it at least partially covers said golf bag compartment and a folded second position where it is at least partially folded out of the way to allow access to said golf bag compartment, said canopy assembly comprising:

a canopy having, a top edge, a bottom edge and sides;

a front strut for structurally supporting said top edge of said canopy, said front strut being attached to the frame assembly;

fastening means attaching said front strut to said top edge of said canopy;

a frame structure substantially supporting said canopy;

a base member for supporting said frame structure, wherein said frame structure is pivotally attached to said base member; and a fastener for securing said base member to the golf bag support bracket.

2. The canopy assembly according to claim 1 wherein said fastening means includes at least one sleeve sewn into said canopy wherein at least a portion of said frame structure passes through said sleeve.

3. The canopy assembly according to claim 1 wherein said frame structure is pivotally attached to said base member by assembling a first hole near a first end of said frame structure and a second hole near a second end of said frame structure onto mating bosses extending from said base member and securing said frame structure on said bosses.

4. The canopy assembly according to claim 1 wherein said frame structure includes at least one rigid U-shaped bracket.

5. The canopy assembly according to claim 1 wherein said base member is a molded part.

6. The canopy assembly according to claim 1 wherein said fastening means for securing said base member to said golf bag support bracket includes at least one U-bolt surrounding said golf bag support bracket with the ends of said U-bolt passing through openings in said base member.

7. The canopy assembly according to claim 1 wherein said fastening means for securing said base member to said golf bag support bracket includeds at least one threaded fastener passing through said golf bag support bracket and continuing into said base member.

8. The canopy assembly according to claim 1 wherein said frame structure is pivotally attached to said base member by a pivot arm pivotally securing to said base member using fastening means for securing said pivot arm to said base member wherein at least one end of said frame structure is secured to said pivot arm.

* * * * *

UNITED STATES PATENT AND TRADEMARK OFFICE
CERTIFICATE OF CORRECTION

PATENT NO.    : 6,773,052 B1
DATED         : August 10, 2004
INVENTOR(S)   : Stephen Edward Tyrer It is certified that error appears in the above-identified patent and that said Letters Patent is hereby corrected as shown below:

Title page,
Item [57], ABSTRACT,
Line 4, delete "re ward" and replace with -- rearward --.

Column 3,
Line 62, delete "." and replace it with -- ; and --
After line 62, add -- FIG. 10A is an enlarged partial view showing the attachment of a modified front strut --.

Column 4,
Lines 33 and 34, delete "dub" and replace with -- club --.

Column 5,
Line 19, delete "148" and replace with -- 14B --.

Column 8,
Line 2, delete "fold d" and replace with -- folded --.
Line 43, delete "194"
Line 44, delete "and 628"
Line 45, delete "176" and replace with -- 194 --.
Line 50, delete "and"
Line 51, delete "141B".

Signed and Sealed this

Twenty-fifth Day of January, 2005

JON W. DUDAS
*Director of the United States Patent and Trademark Office*